(12) United States Patent
Soga et al.

(10) Patent No.: US 6,616,311 B2
(45) Date of Patent: Sep. 9, 2003

(54) INTERIOR LIGHT SYSTEM FOR VEHICLES

(75) Inventors: Hisashi Soga, Saitama (JP); Takeshi Sato, Saitama (JP)

(73) Assignee: Kabushiki Kaisha T and T, Kawagoe (JP)

(*) Notice: Subject to any disclaimer, the term of this patent is extended or adjusted under 35 U.S.C. 154(b) by 0 days.

(21) Appl. No.: 09/986,951

(22) Filed: Nov. 13, 2001

(65) Prior Publication Data

US 2002/0067616 A1 Jun. 6, 2002

(51) Int. Cl.⁷ .................................................. B60Q 1/26
(52) U.S. Cl. ........................ 362/488; 362/487; 362/490
(58) Field of Search ............................... 362/487, 488, 362/490, 394, 237, 543, 544

(56) References Cited

U.S. PATENT DOCUMENTS 6,092,917 A * 7/2000 Litke et al. ................. 362/488
6,273,593 B1 8/2001 Yabata et al. ............... 362/488

* cited by examiner

Primary Examiner—Sandra O'Shea
Assistant Examiner—Guiyoung Lee
(74) Attorney, Agent, or Firm—Nixon & Vanderhye P.C.

(57) ABSTRACT

Conventionally, in order to downsize the enclosure, there was no other choice than downsizing the enclosure and decreasing the area of the lens plate, or increasing the area of the lens plate and increasing the enclosure as well. However, decreasing the area of the lens plate disadvantageously lowers brightness of illumination. In contrast to this, when the dimensions of the lens plate are increased, the proportion of the area of the lens plate with respect to the roof increases, which leads to a problem in terms of design. Accordingly, the present invention provides an interior light system for vehicles comprising a lamp accommodated in the enclosure, a push switch for turning on and off the lamp fixed in the enclosure, and a lens plate journaled at the ends of the opening of the enclosure for a swinging motion, in which the push switch is turned on and off by pressing the lens plate, thereby turning the lamp on and off.

13 Claims, 8 Drawing Sheets

INTERIOR LIGHT SYSTEM FOR VEHICLES

BACKGROUND OF THE INVENTION

1. Field of the Invention

The present invention relates to an interior light system for vehicles to be mounted on the interior roof of a vehicle, which is turned on and off by opening and closing the door, and by switching on and off via a lens plate, and to an interior light system comprising three lamps in which one of them is able to be turned on and off in the same manner as a single lamp type, and the other two lamps are able to be turned on and off by switching via the lens plate so as to be used as a map light.

2. Description of the Related Art

An interior light system for vehicles generally used in the related art includes a single lamp type and a three lamp type that is provided with a map light. The single lamp interior light system for vehicles comprises an interior lamp that is turned on and off by a switching operation in addition to the opening and closing of the door, and the three lamp interior light system for vehicles comprises the interior lamp and two lamps (generally called map lights) disposed on both sides of the interior lamp, in which the interior lamp can be turned on and off in a manner described above, and the map lights are turned on and off only by turning the individually provided switches on and off.

In these two types of interior light systems for vehicles in the related art, the switch for turning on and off the interior lamp and the switch for turning on and off the map light are separately provided, and thus a knob for controlling the switch is required. Accordingly, it has been necessary to increase the dimensions of the enclosure.

The only way to miniaturize the enclosure was to decrease the area of the lens plate, but it causes a problem that the brightness of the lens decreases as the dimensions of the lens plate decreases. When the dimensions of the lens plate are increased to increase the brightness of the illumination, the area of the interior light system that occupies the roof of the vehicle increases, which may lead to the problem that the design freedom for the light decreases.

SUMMARY OF THE INVENTION

Accordingly, the present invention is intended to solve the problems described above, and it is an object of the present invention to provide an interior light system for vehicles that can be miniaturized without decreasing the lens area and thus without lowering the brightness of illumination by utilizing the lens plate as a knob for a switching operation and that has novelty in design.

In order to achieve the object described above, a interior light system of the present invention comprises a lamp accommodated in an enclosure, a push switch for turning on and off the lamp fixed in the enclosure, and a lens plate journaled at the ends of the opening of the enclosure for a swinging motion, in which the push switch is turned on and off by pressing the lens plate, thereby turning the lamp on and off.

The interior light system of the present invention also comprises lamps each accommodated in the lamp compartments divided by at least two dividing walls in the enclosure, a push switch for turning on and off the lamp fixed in the lamp compartment, and a lens plate journaled at the ends of the opening of the lamp compartment for a swinging motion, in which the push switch corresponding to each lens is turned on and off by pressing each lamp plate so that the lamp behind the lens plate is turned on and off.

In addition, the interior light system of the present invention comprises a locking strip on the free end of the lens plate, and a hole formed on the portion of the enclosure facing toward the locking strip for preventing the lens plate from rising from the enclosure by an upward pushing force of the push switch for the lens plate, and a final control element formed on the lens plate according to the present invention is disposed at the position facing toward the final control element of the push switch so that the final control element of the push switch is pressed by the final control element by the swinging motion of the lens plate.

The lamps in the first embodiment and the lamp disposed at the center in the second embodiment are connected to the door switch, and the lamps have such a circuit construction that they are turned on when the door is opened, and the lamp compartments other than the center portion are formed with a douser so that light from the lamp is converged onto the lens portion of the lens plate.

DESCRIPTION OF THE PREFERRED EMBODIMENTS

Referring now to FIGS. 1 to 4, the first embodiment of the interior lamp of the interior light system according to the present invention will be described.

An enclosure 1 formed of plastic comprises a flange 11, and a pair of uprising strips 3 for holding the lamp 2 are provided on the bottom surface 12. A push switch 4 is, for example, an index rotary switch of U.S. Pat. No. 4,891,476, formed with the final control element 41 faced upward. The push switch is referred to simply as a switch, hereinafter.

Figure 2:
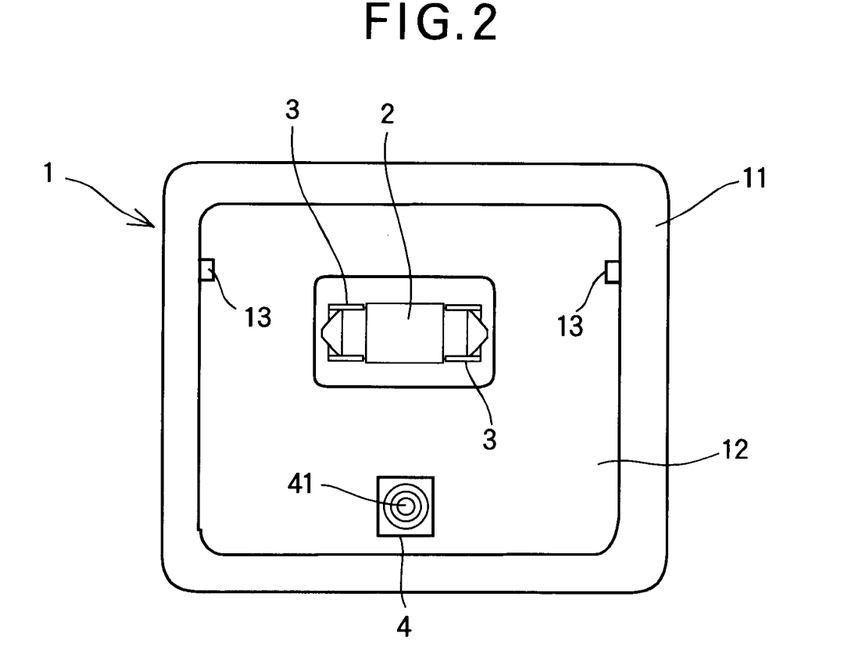
FIG. 2 is a front view of the interior light system for vehicles shown in FIG. 1 in a state in which the lens plate is removed.
Figure 4:
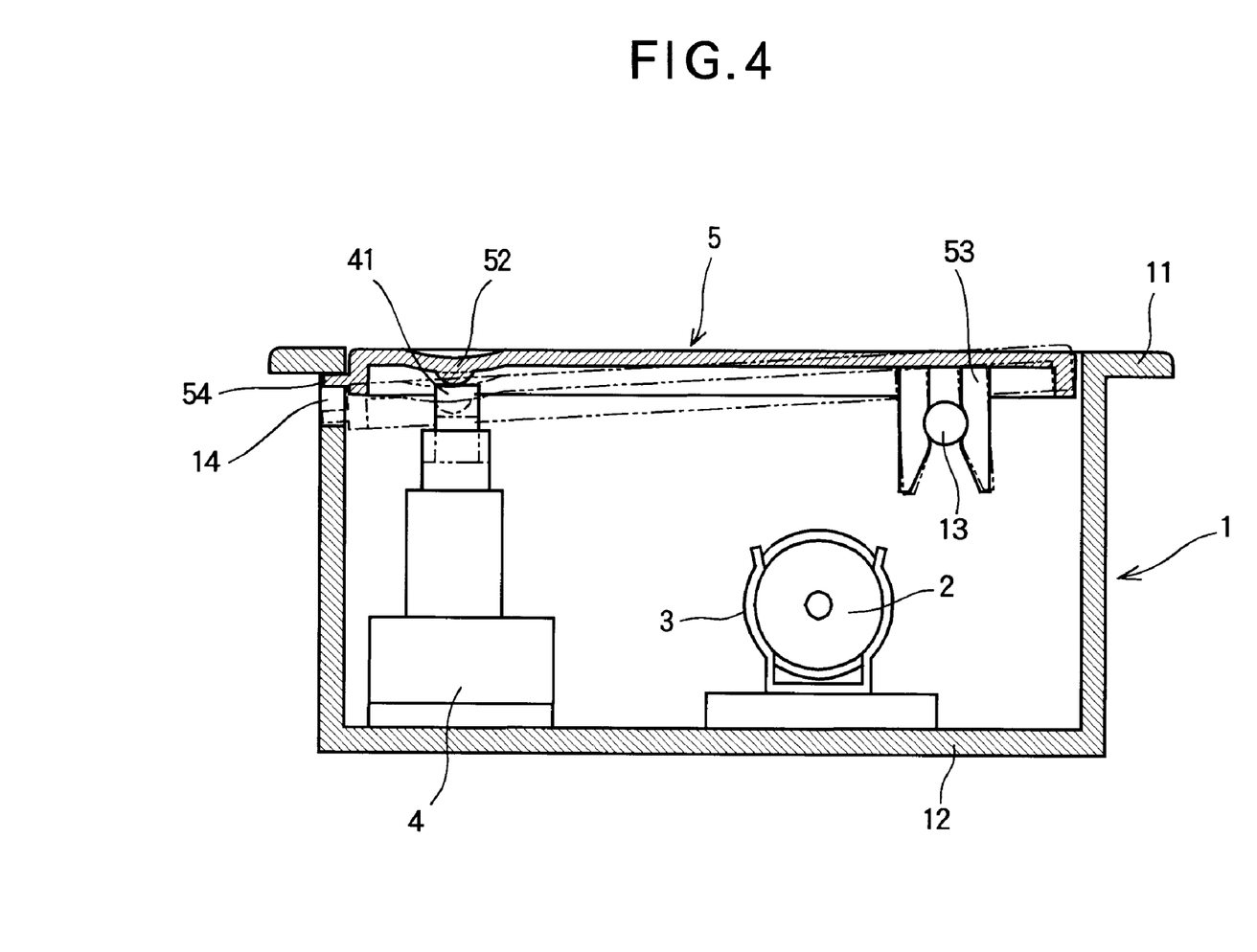
FIG. 4 is a cross sectional view taken along the line B—B of FIG. 2.

The uprising strip 3 and a contact strip extending from the contact point of the switch 4 are electrically connected by a bass bar (not shown) disposed on the bottom. The bass bar also serves as a door switch that turns the lamps on and off by the vehicle-mounted battery and by the opening and closing operation of the door and as a connector terminal (not shown) to be grounded.

Figure 1:
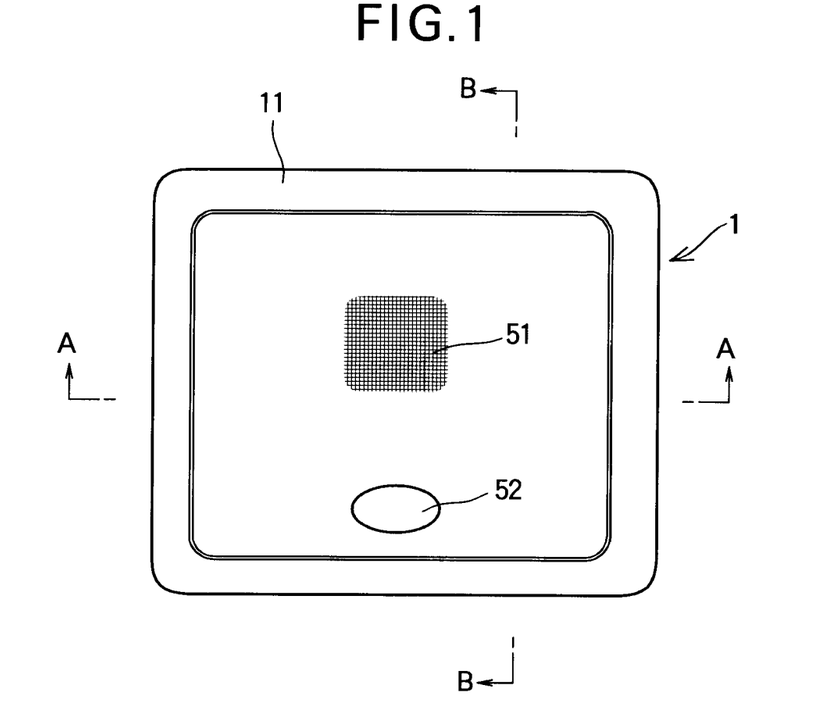
FIG. 1 is a front view of the interior light system for vehicles according to the first embodiment of the present invention.
Figure 3:
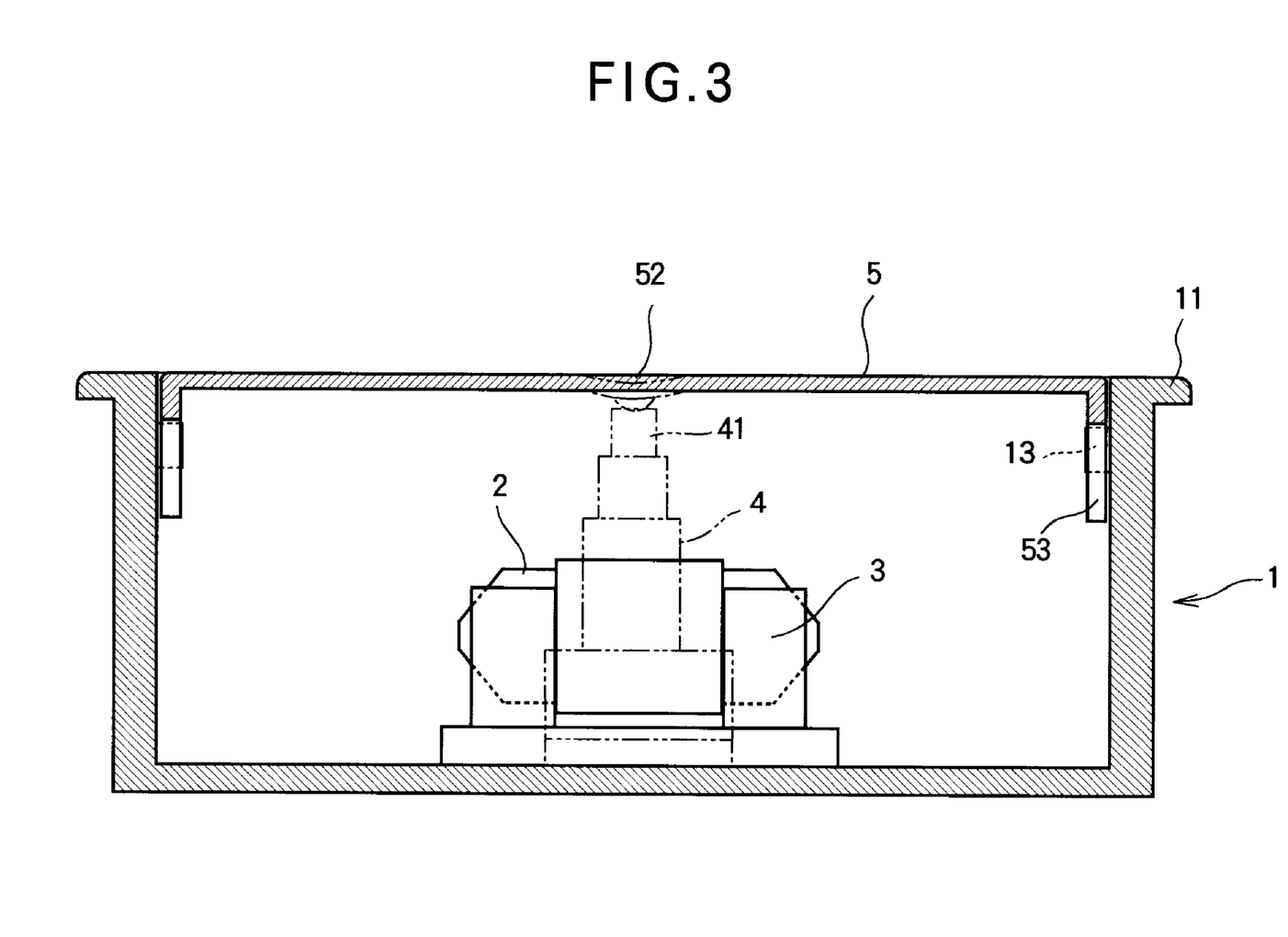
FIG. 3 is a cross sectional view taken along the line A—A of FIG. 1.

A lens plate 5 having dimensions corresponding to the opening of the enclosure 1 comprises a lens portion 51 facing toward the lamp 2, and a final control element 52 facing toward the final control element 41 of the switch 4. The lens plate 5 further is provided on the back side with a bearing 53 journaled so as to be rotatable with respect to the supporting shaft 13 projecting from the opposed inner wall surfaces of the enclosure 1, and on the side surface with a locking strip 54 to be tapped into the hole 14 formed on the wall surface of the enclosure 1.

Subsequently, the operation of the interior lamp system of the present invention based on the construction described above will be described below. When the final lens control element 52 on the lens plate 5 is pressed in the state shown in FIG. 3 and FIG. 4, the lens plate 5 is rotated with the supporting shaft 13 as a fulcrum, and thus the final control element 41 of the switch 4 is pressed, so that the contact point of the switch 4 is closed, and thus the lamp 2 is energized and turned on.

In this state, when a pressing force exerted on the lens plate 5 is released, the lens plate 5 returns to its original horizontal state by a returning force of the final control element 41 of the switch 4, and held in this horizontal position with the locking strip 54 abutted against the hole 14. The switch 4 is maintained in the ON state until the final control element 52 is pressed at another time. Therefore, the lamp 2 is maintained in the illuminated state.

When the lens plate 5 is pressed again, the final control element 52 of the switch 4 is pressed into the OFF state and thus the lamp 2 is turned off. When a pressing force exerted onto the lens plate 5 is released in this state, the lens plate 5 is maintained in the horizontal state and the switch 4 is maintained in the OFF state as described above, thereby maintaining the lamp 2 in the OFF state.

The second embodiment comprising an interior lamp described above, and two map lights on the left and right sides of the interior lamp will now be described referring to FIGS. 5 to 8. The reference numerals identical with those described above represent the identical components, which will not be described again.

The enclosure 1 comprises at least two partition walls 15 for dividing the interior space thereof, and a lamp 2 that serves as an interior lamp is supported in the central compartment, and the lamps 2', 2" that serve as map lights are supported in the right and left compartments by the uprising strips 3, 3', and 3" that are extensions of the bass bar respectively. The interior lamp 2 is fixed at the front side position of the central compartment in a state in which it is mounted on the roof of the vehicle (upper position in FIG. 6), and the map lights 3', 3" are fixed at the positions in the vicinity of the respective partition walls 15.

Figure 6:
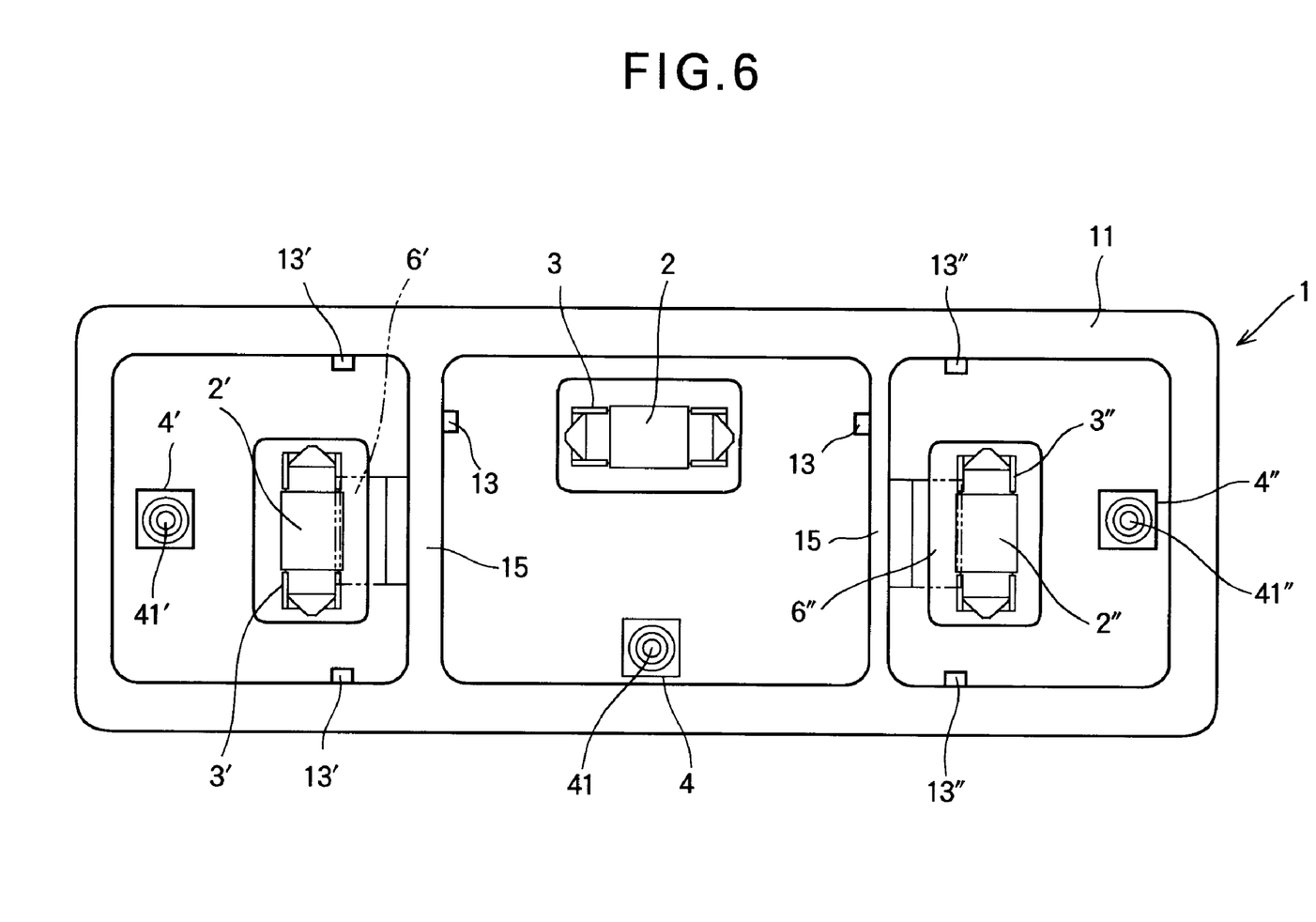
FIG. 6 is front view of the interior light system for vehicles shown in FIG. 5 in a state in which the lens plate is removed.
Figure 7:
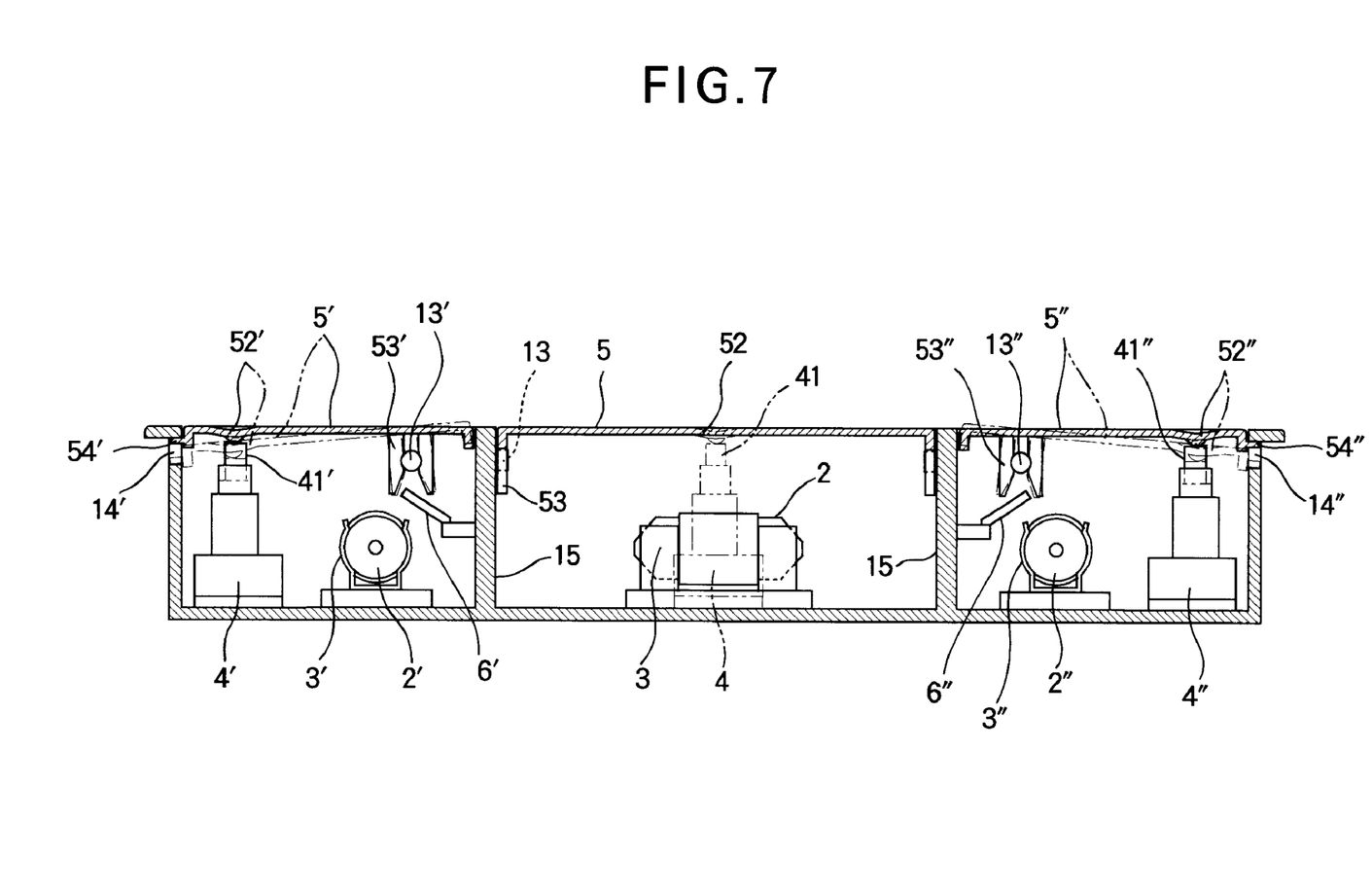
FIG. 7 is a cross sectional view taken along the line C—C in FIG. 5.

The switches 4, 4', 4" are separately mounted at opposing positions from the lamps 2, 2', 2" and connected to the bass bar as in the case of the first embodiment.

Figure 5:
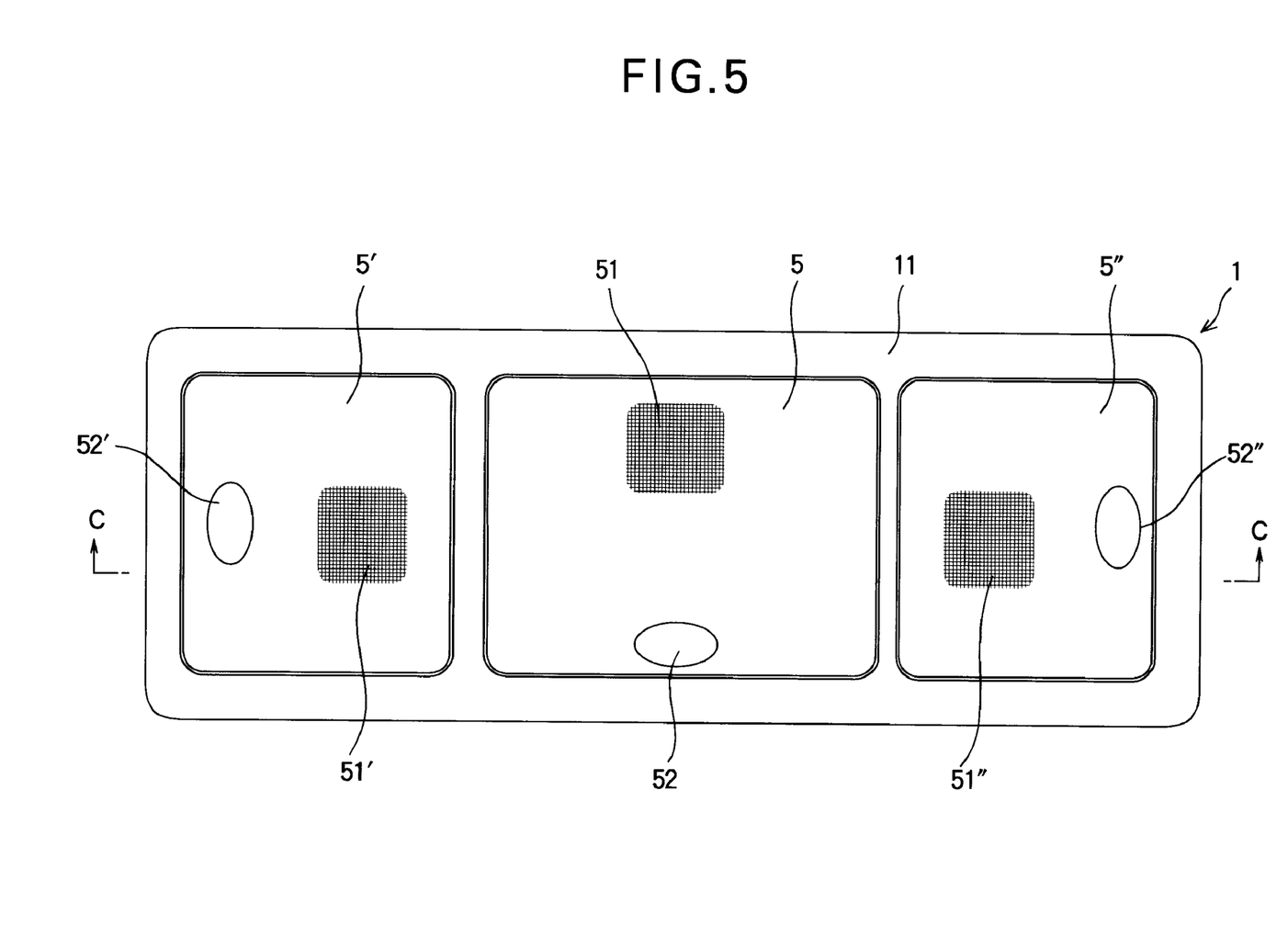
FIG. 5 is a front view of the interior light system for vehicles showing the second embodiment of the present invention.

The lens plates 5, 5', 5" are provided with lens portions 51, 51', 51" opposed to the respective lamps 3, 3', 3", and final control elements 52, 52', 52" opposed to the final control elements 41, 41', 41" of the switches 4, 4', 4".

Figure 8:
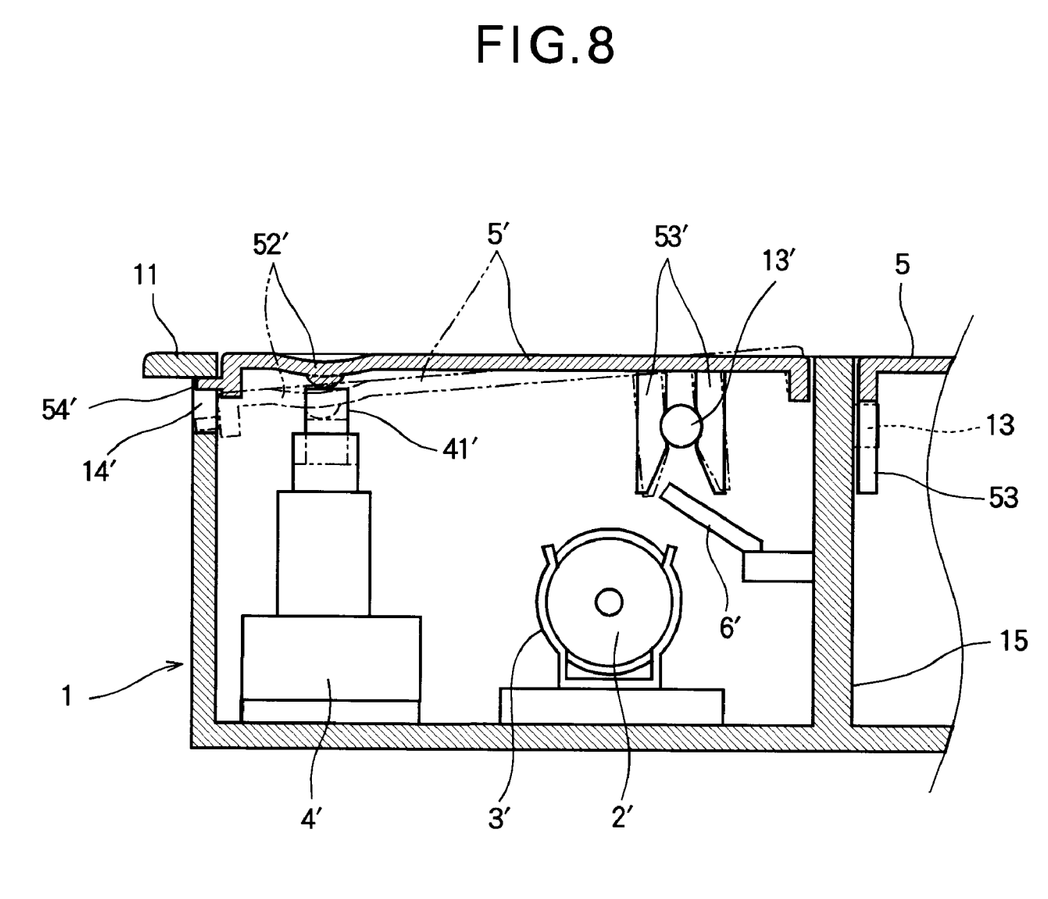
FIG. 8 is a partly enlarged view of FIG. 7.

The lens plates 5, 5', 5" are respectively formed with bearing portions 53, 53', 53" journaled so as to be rotatable with respect to the supporting shafts 13, 13', 13" projecting toward each other from the respective interior walls of the enclosure 1. The respective lens plates 5, 5', 5" are formed with locking strips 54', 54" to be tapped into the holes 14', 14" formed on the wall surface of the enclosure 1 as in the case of the first embodiment described above. Though the lens plate 5 for the central interior lamp is also formed with a locking strip 54 and a hole with which the locking strip 54 is locked, they are not shown because of the position of the cross section taken for the figure.

The reference numerals 6', 6" designate dousers that project from the partition wall 15 toward the map light compartment and cover substantially half of the lamps 2', 2", so that light emitted from the lamps 2', 2" is not radiated toward the rotational fulcrum, but concentrated onto the lens portions 52', 52".

Figure 9:
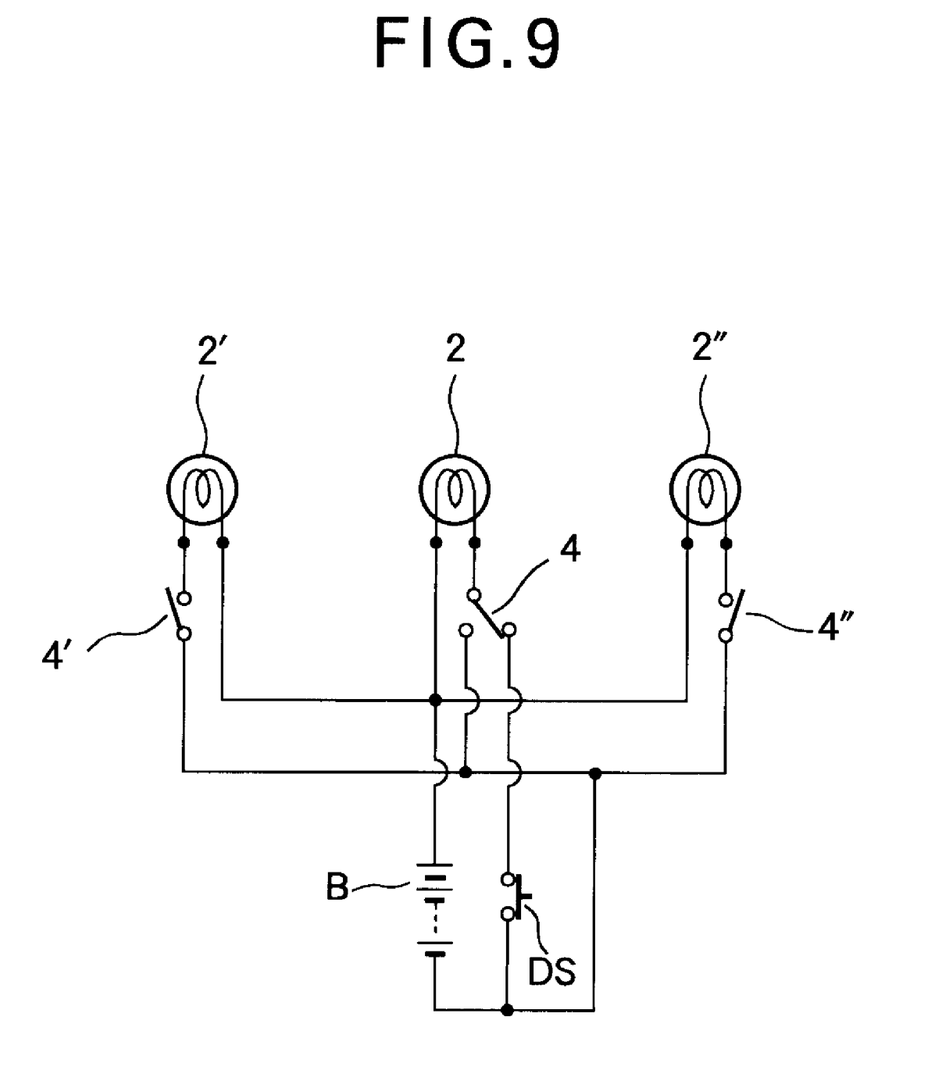
FIG. 9 is an electrical circuit of the interior light system including a door switch.

FIG. 9 is a circuit diagram of the interior light system for vehicles according to the second embodiment, and the reference numerals identical with those in the second embodiment represent the identical components.

In the same figure, DS designates a switch to be turned on and off by opening and closing the door of the vehicle, and is turned on in a state in which the door is opened. B designates a battery mounted on the vehicle.

Subsequently, the operation of the system will be described based on the construction described above. When the switch 4 is in the state shown in FIG. 9 and the door is opened and thus the switch DS is closed, the lamp 2 is turned on and thus illuminates the interior of the vehicle. When the lens plate 5 is pressed to switchover the switch 4 with the door closed, the lamp 2 is also turned on and illuminates the interior of the vehicle.

When switch 4' or the switch 4" is turned on by pressing the lens plate 5' or the lens plate 5", the lamp 2' or the lamp 2" are energized and illuminated irrespective of opening or closing of the door. Since light emitted from the lamps 2', 2" is converged onto the lens potions 51', 51" of the lens plates 5', 5" by the dousers 6', 6" in this state, respectively, light emitted from the lens portions 51', 51" illuminate the front passenger seat or the driver's seat to enable the occupants to look at a map or the like.

Since the action of switching over the switches 4, 4', 4" by pressing the lens plates 5, 5', 5" is the same as in the case of the first embodiment, the description will not be made again.

The interior light system of the present invention comprises a lamp accommodated in an enclosure, a push switch for turning on and off the lamp fixed in the enclosure, and a lens plate journaled at the ends of the opening of the enclosure for a swinging motion, in which the push switch is turned on and off by pressing the lens plate, thereby turning the lamp on and off. Therefore, the lens plate can be used as a knob for controlling the switch to turn the lamp on and off, whereby downsizing of the enclosure is realized and an interior light system for vehicles having novelty in design may be manufactured.

A light system of the present invention also comprises lamps accommodated respectively in the lamp compartments divided by at least two dividing walls in the enclosure, a push switch for turning on and off the lamp fixed in the lamp compartment, and a lens plate journaled at the ends of the opening of the lamp compartment for a swinging motion, in which the push switch corresponding to each lens is turned on and off by pressing each lens plate so that the lamp behind the lens plate is turned on and off. Therefore, the lamp at the center portion may be used as an interior lamp interlocked with the door switch, and other lamps as map lights, whereby the final control element for the switch may be prevented from being exposed as in the case of the related art, and only the lens plate is visible, which may show a smart design.

The lamp used as a map light is provided with a douser in the vicinity thereof, which converges light emitted from the lamp onto the lens portion of the lens plate, whereby brightness of the lamp as a map light is advantageously increased.

What is claimed is:

1. An interior light system for vehicles comprising:

an enclosure defining an interior space and having a pair of support shafts protruding from opposite sides of the enclosure into said interior space;

a lamp operatively accommodated in said enclosure;

a push switch positioned within the interior space of the enclosure and operatively connected to the lamp for turning the lamp on and off; and a lens plate covering the interior space of the enclosure and the lamp and switch positioned therewithin, wherein said lens plate includes (i) a pair of bearing elements extending from a back side of the lens plate into said interior space of the enclosure, each of said bearing elements being journaled to a respective one of the support shafts so as to allow the lens plate to rotate thereabout between depressed and non-depressed conditions, and (ii) a lens control element positionally opposed to the switch so as to operate the switch in response to the lens plate being rotated into its depressed condition, wherein the lamp is turned on and off.

2. An interior light system for vehicles according to claim 1, wherein the enclosure further comprises a hole, and said lens plate further comprises a locking strip on a free end of the lens plate which is cooperatively received within said hole for preventing the lens plate from rising from the enclosure by an upward pushing force of the push switch acting on the lens plate.

3. An interior light system for vehicles according to claim 1 or claim 2, wherein said push switch includes a switch control element, and wherein said lens control element comprises a protrusion formed on the back side of said lens plate in facing relationship to said switch control element, wherein said switch control element is pressed by said protrusion of said lens control element in response to said lens plate being pivoted between said depressed and non-depressed conditions.

4. An interior light system for vehicles according to claim 1 or claim 2, wherein the lamp is adapted for connection to a door switch of a vehicle door, and wherein the lamp comprises a circuit construction such that the lamp is turned on when the vehicle door is opened.

5. The combination comprising a vehicle door switch, and an interior light system as in claim 4.

6. An interior light system for vehicles comprising:

an enclosure defining an interior space and having at least one dividing wall for dividing the interior space into a plurality of lamp compartments, at least one and another of said lamp compartments each having a pair of support shafts protruding from opposite sides thereof into the interior space of the lamp compartment;

a plurality of lamps each accommodated in a respective said one and another lamp compartments;

a plurality of push switches each of which is positioned within said respective one and another lamp compartments and operatively connected to a respective one of said lamps therewithin for turning said respective one of the lamps on and off; and a plurality of lens plates each covering a respective said one and another lamp compartments, wherein each said lens plate includes (i) a pair of bearing elements extending from a back side of the lens plate into said interior space of said respective lamp compartment, each of said bearing elements being journaled to a respective one of the support shafts so as to allow the lens plate to rotate thereabout between depressed and non-depressed conditions, and (ii) a lens control element positionally opposed to a respective switch positioned within said one and another said lamp compartments so as to operate said respective switch in response to the lens plate being rotated into its depressed condition, wherein the lamp is turned on and off.

7. An interior light system for vehicles according to claim 6, further comprising a douser formed in the lamp compartments other than the central compartment out of the lamp compartments so that light emitted from the lamp is converged onto the lens portion of the lens plate.

8. An interior light system for vehicles according to claim 6, wherein each of said one and another lamp compartments of said enclosure further comprises a hole, and wherein each said lens plate further comprises a locking strip on a free end of the lens plate which is cooperatively received within said hole for preventing the lens plate from rising from the enclosure by an upward pushing force of said respective push switch acting on the lens plate.

9. An interior light system for vehicles according to claim 6 or 8, wherein each said respective push switch includes a switch control element, and wherein said each said lens control element comprises a protrusion formed on the back side of said lens plate in facing relationship to said switch control element, wherein said switch control element is pressed by said protrusion of said lens control element in response to said lens plate being pivoted between said depressed and non-depressed conditions.

10. An interior light system for vehicles according to claim 6 or 8, wherein at least one of said lamps is adapted for connection to a door switch of a vehicle door, and wherein said at least one lamp comprises a circuit construction such that said at least one lamp is turned on when the vehicle door is opened.

11. An interior light system for vehicles according to claim 10, wherein said enclosure includes two dividing walls for dividing said enclosure into three said lamp compartments, each said lamp compartment comprising a respective one of said lamps, push switches and lens plates.

12. An interior light system for vehicles according to claim 6 or claim 8, wherein said enclosure includes two dividing walls for dividing said enclosure into three said lamp compartments, each said lamp compartment comprising a respective one of said lamps, push switches and lens plates.

13. The combination comprising a vehicle door switch, and an interior light system as in claim 10.

* * * * *